Patented Aug. 2, 1938

2,125,649

UNITED STATES PATENT OFFICE 2,125,649

PRODUCTION OF POLYMERIZATION PRODUCTS FROM THIOVINYL ETHERS

Walter Reppe and Hanns Ufer, Ludwigshafen-on-the-Rhine, and Erich Kuehn, Mannheim, Germany, assignors to I. G. Farbenindustrie Aktiengesellschaft, Frankfort-on-the-Main, Germany No Drawing. Application August 1, 1935, Serial No. 34,295. In Germany August 3, 1934

10 Claims. (Cl. 260—2)

The present invention relates to polymerization products from thiovinyl ethers and a process of producing same.

We have found that the vinyl ethers of monovalent or polyvalent mercaptans of the aliphatic, aliphatic-aromatic, aromatic, hydroaromatic or heterocyclic series which contain but one vinyl group attached to one sulphur atom, can be polymerized to form valuable products. The following thiovinyl ethers may be mentioned by way of example: vinyl ethers of alkyl or hydroxyalkyl mercaptans (ethyl mercaptan, propyl mercaptan, isobutyl mercaptan, octodecyl mercaptan, octodecenyl mercaptan, thioalkylene captan, glycols and thioglycerines), vinyl ethers of aromatic mercaptans (thiophenol, thiocresol, di- and poly-sulphhydryl-benzenes, -naphthalenes, -anthracenes and -anthraquinones), vinyl ethers of mono- or poly-sulphhydryls of other isocyclic or heterocyclic compounds (mercapto-benzothiazole) and vinyl ethers of aralkylsulphhydryls (phenyl-ethylmercaptan).

The polymerization of the thiovinyl ethers may be carried out under most varied conditions. The pure compounds even commence in part to polymerize by long standing at ordinary temperature, but it is generally speaking preferable to influence the polymerization by definite conditions in order to obtain unitary and valuable products.

As conditions of the said kind may be mentioned increased temperatures, especially those between 50° and 120° C. The polymerization may also be influenced by light, especially short-wave light. Furthermore the polymerization may be accelerated or retarded, polymerization products of greatly varied physical properties (molecular size, solubility or mechanical strength) thus being obtainable depending on the conditions employed.

The polymerization conditions should be selected so that a splitting off of the vinyl groups is avoided. Thus, for example, care must be taken that during the polymerization no dilute acids or anhydrous mineral acids are present at the same time as compounds containing hydroxyl groups, as for example alcohols. Alkaline substances, such as the oxides, hydroxides and carbonates of the alkali metals have, however, no decomposing action. Moreover by polymerizing at too high temperatures, as for example above about 200° C. decomposition may take place in addition to strong discoloration.

Small amounts of agents having an acid action, such as boron fluoride, tin chloride, zinc chloride, aluminum chloride, phosgene, sulphur dioxide, carbon dioxide, thionyl chloride, hydrogen fluoride, hydrogen chloride and the halogens are suitable as polymerization accelerators. Substances having large surfaces, such as active carbon and bleaching earths, and also inorganic and organic peroxides (hydrogen peroxide, sodium peroxide, barium peroxide and benzoyl peroxide), ozone and atmospheric oxygen also have an accelerating effect.

The polymerization may also be retarded. As suitable polymerization retarders may be mentioned alkaline compounds, as for example the oxides, hydroxides and carbonates of the alkali metals, calcium hydroxide, the alkali and alkaline earth metals, organic bases, as for example methylamine, dimethylamine, butylamine, piperidine, aniline, para-phenylene-diamine or dimethylaniline, many of the alcohols, as for example ethanol, cyclohexanol or glycol, and also phenols, such as hydroquinone, pyrocatechol or pyrogallol.

The polymerization may also be carried out with an addition of solvents, as for example hydrocarbons, such as benzene, toluene, xylene, ligroin or cyclohexane, or of ethers, ketones, or alcohols.

The purity of the compounds employed also has an influence on the course of the polymerization. The purification may be effected for example by careful distillation under reduced pressure, by crystallization or by freezing, depending on the properties of the initial materials. In the case of sensitive thiovinyl ethers it is advantageous to work in the presence of a substance which prevents their decomposition, alkali metals and their hydroxides and carbonates being especially suitable for this purpose.

By suitable selection of the accelerator, retarder and the other reaction conditions, such as temperature, concentration, type of polymerization (block, solution or emulsion polymerization) and use of diluents, polymerization products having greatly varied molecular size and having a great variety of physical properties may be obtained which are suitable for numerous purposes, as for example for the preparation of plastic mases, films, threads, coatings, lacquers, priming compositions, mastics or insulating substances.

By adding softening agents, such as dibutylphthalate, tricresyl phosphate, polybenzylnaphthalene, chlorinated naphthalene or chlorinated diphenyl, during or after the polymerization, the properties of the polymerization products may also be varied within wide limits.

Furthermore mixed polymerization products may also be obtained by polymerizing the said thiovinyl ethers in admixture with other polymerizable compounds, as for example vinyl ethers, vinyl esters, vinyl chloride, styrene, acrylic acid or methylacrylic acid or their derivatives, unsaturated ketones, such as isopropenyl methyl ketone, vinyl methyl ketone, or unsaturated polymerizable hydrocarbons, such as butadiene, isoprene or vinyl acetylene, or polymerizable oils, such as linseed oil or China-wood oil. The said compounds may also be added in a freshly-polymerized condition to the thiovinyl ethers before, during or after the polymerization of the latter.

If desired, the polymerization products may be subjected to an aftertreatment with halogen, advantageously a subsequent chlorination in the presence of organic solvents. The polymerization products may also be changed to a great extent by fillers and pigments. The polymerization products may be converted into valuable plastic masses by pressing, rolling, injection-moulding, blowing or cutting.

The following examples will further illustrate how the said invention may be carried out in practice but the invention is not restricted to these examples. The parts are by weight.

Example 1.—50 parts of vinyl ethyl sulphide are slowly introduced while stirring into 50 parts of liquid sulphur dioxide at 20° below zero C. The polymerization immediately commences with evolution of heat. The polymerization product formed separates, but dissolves again by stirring for some time. The polymerization is completed after about three hours. The sulphur dioxide is then evaporated and the remaining polymerization product purified by washing with alcohol or treatment with steam. It is a mass which is solid at room temperature.

Example 2.—Vinyl-para-tolyl sulphide is allowed to stand for 14 days at from 70° to 90° C. Unchanged vinyl-para-tolyl sulphide is then distilled off under reduced pressure. A very viscous oil remains which forms a solid hard mass after boiling several times with alcohol.

Example 3.—Vinyl-para-tolyl sulphide is irradiated in a thin layer with the short-wave light from a mercury vapor lamp for five hours at from 50° to 60° C. Non-polymerized and any slightly polymerized constituents are removed by distillation under reduced pressure. A yellowish viscous oil is obtained which is converted into a white mass solid at room temperature by boiling with alcohol.

Example 4.—Vinyl-para-tolyl sulphide is shaken for 14 days at about 70° C. after the addition of a little gaseous boron fluoride. A red clear mass is obtained which is practically solid at room temperature.

Example 5.—40 parts of vinyl-para-tolyl sulphide and 2 parts of bleaching earth are shaken for 20 days at from 70° to 80° C. A mass is obtained which is viscous at room temperature and mobile at from 70° to 80° C.

Example 6.—40 parts of vinyl-para-tolyl sulphide and 0.5 part of crystallized zinc chloride are shaken for 20 days at from 70° to 80° C. A polymerization product is obtained which is viscous at room temperature and readily mobile at from 70° to 80° C.

Corresponding polymerization products are obtained by the addition of small amounts of iodine.

Example 7.—100 parts of vinyl-para-tolyl sulphide are introduced into 100 parts of liquid sulphur dioxide at 20° below zero C. while stirring. After stirring for ten hours at the said temperature, the sulphur dioxide is evaporated. There remains after washing with alcohol a solid, almost colorless polymerization product.

Example 8.—A mixture of 20 parts of vinyl octodecenyl ether, 20 parts of vinyl-para-tolyl sulphide and 2 parts of crystallized zinc chloride (or a small amount of gaseous boron fluoride) is shaken for about 14 days at from 70° to 80° C. A slightly green colored oil is obtained which is thick and scarcely mobile at room temperature and mobile at from 70° to 80° C.

Example 9.—A mixture of 15 parts of vinyl-para-tolyl sulphide, 40 parts of water, 0.2 part of a condensation product from an aminoalkyl sulphonic acid and a fatty acid, 0.12 part of the sodium salt of isobutylnaphthalene sulphonic acid and 0.3 part of 30 per cent hydrogen peroxide is shaken for 20 days at from 70° to 80° C. A white emulsion of polymerized vinyl-para-tolyl sulphide is obtained.

Example 10.—50 parts of 1.8-chlorthionaphthol vinyl ether are introduced into 100 parts of liquid sulphur dioxide at 20° below zero C. The whole is stirred at the said temperature for about 12 hours. The sulphur dioxide is then distilled off. A hard, solid, pulverizable polymerization product is obtained.

Example 11.—50 parts of a mixture of equal amounts of vinyl octodecyl sulphide and vinyl octodecyl ether are slowly introduced while stirring into 50 parts of liquid sulphur dioxide at 20 to 30° below zero C. The polymerization immediately commences with evolution of heat. The polymerization product formed is separated after stirring for some time by evaporating the sulphur dioxide.

Instead of vinyl octodecyl sulphide other vinyl alkyl sulphides, such as vinyl dodecyl sulphide, vinyl octodecenyl sulphide or mixtures of different vinyl alkyl sulphides with vinyl alkyl ethers may be employed, similar polymerization products being obtained.

Example 12.—40 parts of octodecyl vinyl sulphide are entered at 20° below zero C. into 200 parts of liquid anhydrous sulphur dioxide. The mixture is stirred for about 12 hours at 10° below zero C. After distilling off the sulphur dioxide the polymerization product remains as a paraffin-like mass which is solid at room temperature.

In a similar manner other vinylalkyl sulphides, as for example vinyldodecyl sulphide either alone or in mixture with one another or other polymerizable vinyl compounds, or other vinyl sulphides, as for example S-vinylthioglycollic acid butyl ester of the formula $CH_2CHSCH_2COOC_4H_9$ may also be polymerized.

Example 13.—A slight amount of iodine (from about 0.05 to about 0.3 gram, depending on the degree of purity of the initial substance) is added to 50 parts of vinyloctodecyl sulphide, while stirring. The mixture is then heated at from 40° to 50° C. for 12 to 24 hours. The vinyloctodecyl sulphide which is liquid at room temperature has then passed into a paraffin-like mass which is solid at room temperature.

Example 14.—A mixture of equal amounts of vinyl-para-tolyl sulphide and styrene is heated under reflux at from 70° to 80° C. for 24 hours, then for 12 hours at 100° C., for 12 hours at 120° C., for 12 hours at 140° C., for 12 hours at 160° C. and finally for 10 hours at 180° C. The polymerization product thus obtained may be employed for a great variety of technical purposes. By varying the ratio of the starting materials, the kind and duration of heating and, if desired, by adding substances having a catalytic action, masses can be obtained which are from solid to plastic at room temperature.

Interpolymerization products of a similar nature may be obtained by employing other vinyl sulphides, as for example vinylnaphthyl sulphides, vinylalkyl sulphides and also vinyl compounds other than styrene.

What we claim is:—

1. A process of producing polymerization products which comprises polymerizing in the presence of sulphur dioxide a vinyl ether of a mercaptan which contains but one vinyl group attached to one sulphur atom.

2. A polymerized vinyl aryl sulphide obtained according to the process of claim 8.

3. Polymerized vinyl-para-tolyl sulphide obtained according to the process of claim 8.

4. Polymerized vinyl octodecyl sulphide obtained according to the process of claim 7.

5. Vinyl octodecyl sulphide interpolymerized with vinyl octodecyl ether obtained according to the process of claim 9.

6. A process of producing polymerization products which comprises polymerizing a vinyl ether of a mercaptan which contains but one vinyl group attached to one sulphur atom, in the presence of a polymerization accelerator selected from the group consisting of inorganic peroxides, organic peroxides, ozone, oxygen, boron fluoride, tin chloride, zinc chloride, aluminum chloride, phosgene, sulphur dioxide, carbon dioxide, thionyl chloride, hydrogen fluoride, hydrogen chloride and the halogens.

7. A process of producing polymerization products which comprises polymerizing a vinyl ether of an alkyl mercaptan in the presence of a polymerization accelerator selected from the group consisting of inorganic peroxides, organic peroxides, ozone, oxygen, boron fluoride, tin chloride, zinc chloride, aluminum chloride, phosgene, sulphur dioxide, carbon dioxide, thionyl chloride, hydrogen fluoride, hydrogen chloride and the halogens.

8. A process of producing polymerization products which comprises polymerizing a vinyl ether of an aryl mercaptan in the presence of a polymerization accelerator selected from the group consisting of inorganic peroxides, organic peroxides, ozone, oxygen, boron fluoride, tin chloride, zinc chloride, aluminum chloride, phosgene, sulphur dioxide, carbon dioxide, thionyl chloride, hydrogen fluoride, hydrogen chloride and the halogens.

9. A process of producing polymerization products which comprises polymerizing a vinyl ether of a mercaptan which contains but one vinyl group attached to one sulphur atom in admixture with another polymerizable compound in the presence of a polymerization accelerator selected from the group consisting of inorganic peroxides, organic peroxides, ozone, oxygen, boron fluoride, tin chloride, zinc chloride, aluminum chloride, phosgene, sulphur dioxide, carbon dioxide, thionyl chloride, hydrogen fluoride, hydrogen chloride and the halogens.

10. A polymerized vinyl ether of a mercaptan which contains but one vinyl group attached to one sulphur atom and which is obtained according to the process of claim 6.

WALTER REPPE.
HANNS UFER.
ERICH KUEHN.